United States Patent
Yasui et al.

(10) Patent No.: US 8,989,964 B2
(45) Date of Patent: Mar. 24, 2015

(54) VEHICLE SPEED CONTROL DEVICE

(75) Inventors: Yoshiyuki Yasui, Nagoya (JP); Hiroaki Aizawa, Anjyo (JP)

(73) Assignee: Advics Co., Ltd., Aichi-Ken (JP)

( * ) Notice: Subject to any disclaimer, the term of this patent is extended or adjusted under 35 U.S.C. 154(b) by 740 days.

(21) Appl. No.: 12/977,904

(22) Filed: Dec. 23, 2010

(65) Prior Publication Data

US 2011/0160963 A1 Jun. 30, 2011

(30) Foreign Application Priority Data

Dec. 28, 2009 (JP) .................................. 2009-296919

(51) Int. Cl.
| | |
|---|---|
| *B60K 7/00* | (2006.01) |
| *B60B 35/10* | (2006.01) |
| *B62D 11/00* | (2006.01) |
| *B62D 11/24* | (2006.01) |

(52) U.S. Cl.
CPC .............. *B62D 11/003* (2013.01); *B62D 11/24* (2013.01); *Y02T 10/7258* (2013.01)
USPC ............... 701/41; 701/42; 180/411; 180/444; 180/421; 180/197; 180/204; 180/443; 180/446

(58) Field of Classification Search
USPC .............. 701/42, 41; 180/411, 444, 421, 197, 180/204, 446
See application file for complete search history.

(56) References Cited

U.S. PATENT DOCUMENTS

| | | | | |
|---|---|---|---|---|
| 6,549,835 | B2 * | 4/2003 | Deguchi et al. ................. | 701/41 |
| 2005/0230179 | A1 * | 10/2005 | Nakatsu et al. ............... | 180/444 |
| 2008/0066976 | A1 | 3/2008 | Yamada | |

FOREIGN PATENT DOCUMENTS

| | | |
|---|---|---|
| JP | 2002-176707 A | 6/2002 |
| JP | 2007-269129 A | 10/2007 |
| JP | 2008-068832 A | 3/2008 |
| WO | WO 2007/116541 A1 | 10/2007 |

OTHER PUBLICATIONS

Japanese Office Action issued Aug. 20, 2013 by the Japanese Patent Office in Japanese Patent Application No. 2009-296919 and English language translation thereof (6 pgs).

* cited by examiner

*Primary Examiner* — Adam Tissot
(74) *Attorney, Agent, or Firm* — Buchanan Ingersoll & Rooney PC

(57) ABSTRACT

A vehicle speed control device is provided. The device includes a steering device which steers left and right wheels, first and second electric motors which separately apply power to the left and right wheels, an operation amount acquisition unit which acquires an acceleration operation amount by the driver of the vehicle, a steering angle acquisition unit which acquires a steering angle which is a value between an inner wheel steering angle and an outer wheel steering angle; a vehicle speed acquisition unit configured to acquire an actual speed of the vehicle; and a control unit configured to control the first electric motor and the second electric motor on the basis of the acceleration operation amount, the actual speed, the steering angle, and a steering geometry indicating a geometric relationship between the steering angle and a turning center of the vehicle.

9 Claims, 10 Drawing Sheets

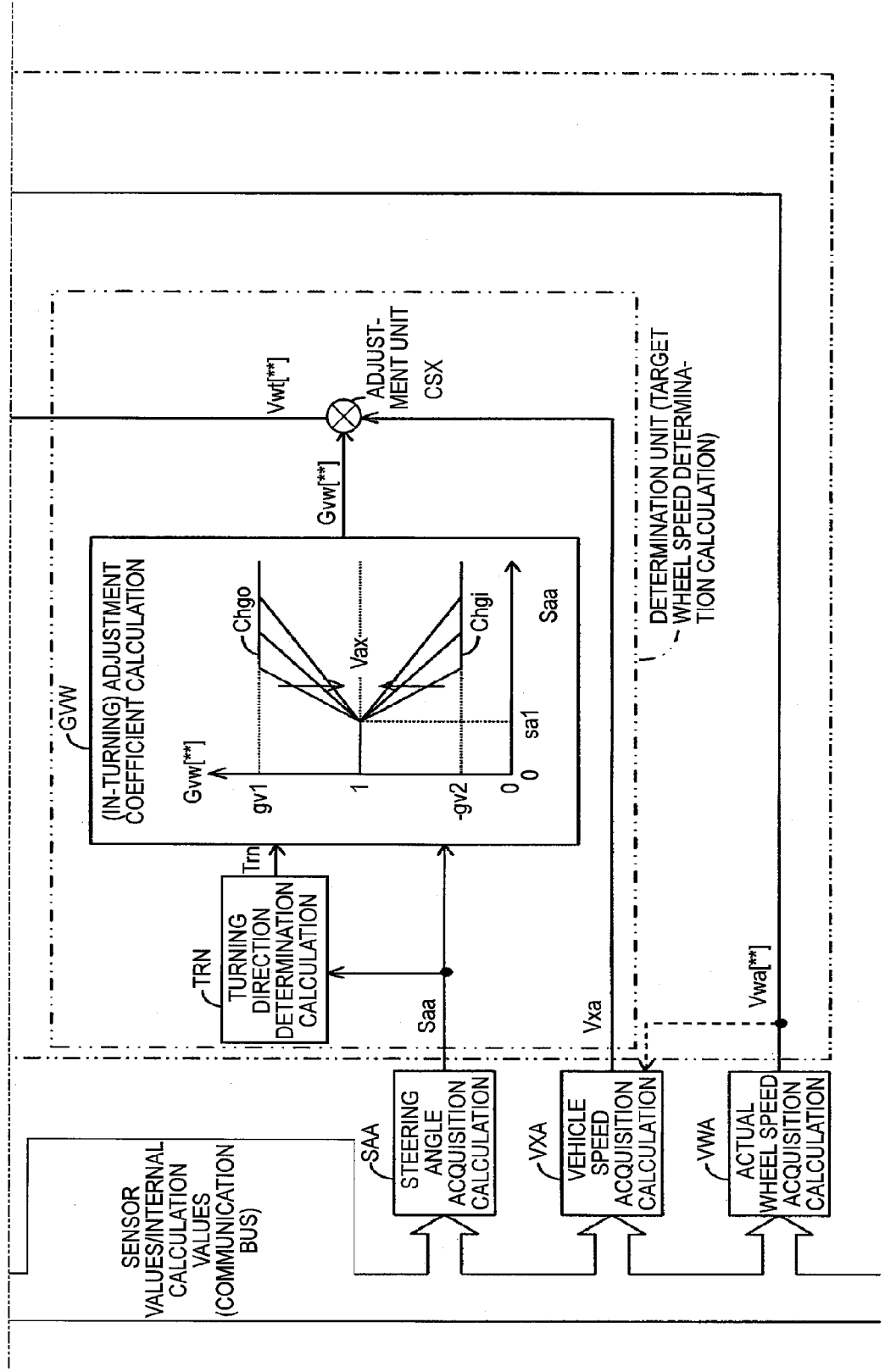
(FIG. 2 Continued)

VEHICLE SPEED CONTROL DEVICE

CROSS REFERENCE TO RELATED APPLICATIONS

This application is based on and claims priority under 35 U.S.C. §119 to Japanese Patent Application 2009-296919, filed on Dec. 28, 2009, the entire content of which is incorporated herein by reference.

BACKGROUND

1. Field of the Invention

The present invention relates to a vehicle speed control device for adjusting a speed (vehicle speed) of a vehicle having electric motors serving as a power source for separately applying power to left and right wheels.

2. Description of Related Art

In a typical four-wheel vehicle, the axles of left and right wheels are mechanically connected to each other through a differential. Power obtained from a single power source (for example, an engine) is transmitted to the left and right wheels (driving wheels) through the differential. In a vehicle turning state, the action of the differential compensates the difference in the wheel speed between the wheels due to the difference in the movement locus between the left and right wheels. As a result, the occurrence of an excessive front-rear skid (a skid in the rolling direction of the vehicle) of the left and right wheels is suppressed.

In the meantime, in recent years, there has been developed a vehicle (in-wheel motor vehicle) having electric motors (called in-wheel motors) respectively provided into the tire wheels of the left and right wheels (for example, see JP-A-2007-269129 and JP-A-2008-068832). In the in-wheel motor vehicle, no differential is provided, and the output shafts of the electric motors for the left and right wheels are not mechanically connected to each other. The electric motors for the left and right wheels are separately controlled, that is, the wheel speeds, the shaft torque, and the like of the left and right wheels can be separately controlled.

The skid of the wheel includes the above-described front-rear skid and a lateral skid which is a skid in the lateral direction with respect to the wheel. If it is assumed that the steering angles of the left and right steering wheels are adjusted in faithful accordance with the theoretical characteristics of the Ackermann geometry, the steering angle (inner wheel steering angle) of a turning inside wheel becomes greater than the steering angle (outer wheel steering angle) of a turning outside wheel. Then, under the condition that the turning center is placed on the extension line of the rear wheel axle, the lateral skid of each wheel in the vehicle turning state becomes zero (in a very low-speed range where centrifugal force is negligible).

However, in practice, it is very difficult to design a steering device in which the steering angles of the left and right steering wheels are adjusted in faithful accordance with the theoretical characteristics of the Ackermann geometry. In an actual steering device, the steering angles of the left and right steering wheels are adjusted in accordance with the characteristics of steering geometry close to Ackermann geometry such that the inner wheel steering angle becomes greater than the outer wheel steering angle. Accordingly, it is possible to suppress the lateral skid of each wheel in the vehicle turning state.

SUMMARY

In the in-wheel motor vehicle, if the electric motors of the left and right wheels are not appropriately controlled in the vehicle turning state, an unnecessary front-rear skid may occur in the left and right wheels due to the difference in the movement locus between the left and right wheels. The unnecessary front-rear skid can be suppressed by appropriately controlling the wheel speed of the left and right wheels.

The present invention has been made on the basis of the above discovery and knowledge, and it is an aspect of the present invention to provide a speed control device of an in-wheel motor vehicle which is capable of suppressing the occurrence of an unnecessary front-rear skid of left and right wheels in a vehicle turning state by appropriately controlling the electric motors of the left and right wheels.

According to an illustrative embodiment of the present invention, there is provided a vehicle speed control device. The vehicle speed control device includes a steering device, a first electric motor, a second electric motor, an operation amount acquisition unit, a steering angle acquisition unit, a vehicle speed acquisition unit, and a control unit.

The steering device steers left and right steering wheels in accordance with an operation of a steering operation member of a vehicle by a driver and, when the steering operation member is operated from a neutral position corresponding to a straight traveling of the vehicle, adjusts an inner wheel steering angle which is a steering angle of a turning inside wheel among the left and right steering wheels and an outer wheel steering angle which is a steering angle of a turning outside wheel such that the inner wheel steering angle becomes greater than the outer wheel steering angle. That is, in this steering device, the steering angles of the left and right steering wheels are adjusted in accordance with the characteristics of a steering geometry close to Ackermann geometry. Thus, the lateral skid of each wheel in the vehicle turning state can be suppressed.

The first electric motor applies power to the right wheel among the left and right wheels of the vehicle. The second electric motor applies power to the left wheel among the left and right wheels of the vehicle. The first and second electric motors can be respectively provided in the tire wheels of the right and left wheels. The output shaft of the first electric motor and the output shaft of the second electric motor are not mechanically connected to each other. That is, in this vehicle, no differential is provided. The operation amount acquisition unit acquires an acceleration operation amount by the driver of the vehicle.

The steering angle acquisition unit acquires a steering angle which is a value between the inner wheel steering angle and the outer wheel steering angle. The steering angle may be an average value of the inner wheel steering angle and the outer wheel steering angle. The vehicle speed acquisition unit acquires an actual speed of the vehicle.

The control unit controls the first electric motor and the second electric motor on the basis of the acceleration operation amount, the actual speed, the steering angle, and a steering geometry of the vehicle. The steering geometry of the vehicle indicates a geometric relationship between the steering angle and a turning center of the vehicle.

According to this configuration, the (first and second) electric motors for the left and right wheels are controlled on the basis of the steering angle and the steering geometry as well as the acceleration operation amount and the actual speed of the vehicle. Thus, the wheel speeds of the left and right wheels can be separately controlled such that the difference in the wheel speed between the left and right wheels due to the different in the movement locus between the left and right wheels can be secured. In other words, the function of the differential can be realized. That is, it is possible to compensate an unnecessary front-rear skid due to the difference in the movement locus between the left and right wheels and to suppress the occurrence of an unnecessary front-rear skid of the left and right wheels in the vehicle turning state.

In the above vehicle speed control device, the control unit may include a reference energization amount calculation unit which calculates the reference energization amount for each of the first electric motor and the second electric motor on the basis of the acceleration operation amount. The control unit may be configured to adjust the energization amount of each of the first electric motor and the second electric motor such that the energization amount of an electric motor corresponding to the turning outside wheel among the first electric motor and the second electric motor becomes greater than the corresponding reference energization amount, and that the energization amount of an electric motor corresponding to the turning inside wheel among the first electric motor and the second electric motor becomes smaller than the corresponding reference energization amount. The reference energization amount may be the energization amount in a state where the vehicle is traveling straight.

According to this configuration, in the vehicle turning state, it is possible to compensate an unnecessary front-rear skid due to the difference in the movement locus between the left and right wheels. The wheel speed of the turning inside wheel is reduced and the wheel speed of the turning outside wheel increases compared to a state where the vehicle is traveling straight. Therefore, the vehicle speed can be easily maintained.

The above vehicle speed control device may further include an actual wheel speed acquisition unit which acquires an actual wheel speed of each of the left and right wheels. The control unit may include a target wheel speed determination unit which determines a target wheel speed of each of the left and right wheels on the basis of the actual speed, the steering angle, and the steering geometry of the vehicle. The control unit may be configured to control the first electric motor and the second electric motor such that the actual wheel speed of each of the left and right wheels reaches the target wheel speed of the corresponding wheel.

According to this configuration, the target wheel speed of each of the left and right wheels is determined on the basis of the steering angle and the steering geometry as well as the actual speed of the vehicle. Therefore, the target wheel speed of each of the left and right wheels can be separately determined accurately such that the difference in the wheel speed between the left and right wheels due to the difference in the movement locus between the left and right wheels can be secured.

In the above vehicle speed control device, the target wheel speed determination unit may be configured to determine the target wheel speed on the basis of a value which is obtained by dividing a wheel base of the vehicle by a tangent of the steering angle.

In the above vehicle speed control device, the target wheel speed determination unit may be configured to determine the turning center of the vehicle on the basis of the steering angle and the steering geometry of the vehicle, to calculate the target angular speed (in the vehicle turning direction) on the basis of the turning center and the actual speed of the vehicle, and to determine the target wheel speed on the basis of the target angular speed.

In the above vehicle speed control device, the target angular speed may be calculated by dividing the actual speed of the vehicle by the distance between the turning center and a standard position of the vehicle. The target wheel speed of each of the left and right wheels is determined by multiplying the distance between the turning center and the position of the wheel by the target angular speed.

According to this configuration, assuming that each wheel is steered around a single common point as the turning center, the target wheel speed of each of the left and right wheels is calculated such that the vehicle can smoothly turn at the target angular speed around the turning center. Therefore, the target wheel speed of each of the left and right wheels can be reliably determined to be an appropriate value for compensating an unnecessary front-rear skid due to the difference in the movement locus between the left and right wheels.

The turning center may be determined as follows. When the actual speed of the vehicle is equal to or lower than a predetermined value, the turning center may be determined as a point which is placed on the extension line of the rear wheel axle of the vehicle and is distant from the standard position (Cvh) of the rear wheel axle inwardly in the turning direction by "a turning radius obtained by dividing the wheel base of the vehicle by the tangent of the steering angle". According to this configuration, the turning center is determined on the extension line of the rear wheel axle in a very low speed-zone (for example, Vxa≤vz1) where centrifugal force is negligible. Therefore, the vehicle can turn such that no lateral skid occurs in the left and right wheels.

When the actual speed of the vehicle is higher than the predetermined value, the turning center may be determined as a point which is further front of the vehicle with respect to the extension line of the rear wheel axle of the vehicle. According to this configuration, the turning center is adjusted in accordance with an increase in the vehicle speed such that a lateral skid occurs in the left and right wheels. Therefore, lateral force which is balanced with centrifugal force can be generated for the left and right wheels.

When the actual speed of the vehicle is higher than the predetermined value, the turning center may be determined at a point positioned further side from the vehicle with respect to a reference line which is in parallel to the front-rear direction of the vehicle and passes a point placed on the extension line of the rear wheel axle of the vehicle and distant from the standard position of the rear wheel axle inwardly in the turning direction by "a turning radius obtained by dividing the wheel base of the vehicle by the tangent of the steering angle". According to this configuration, the turning center is adjusted to be distant from the vehicle in accordance with an increase in the vehicle speed. As a result, the vehicle is adjusted with weaker under-steering tendency, and securing vehicle stability.

As the predetermined value, the vehicle speed (creeping speed) when the vehicle is traveling because of the creep phenomenon may be used (when the driver does not operate the acceleration operation member).

(When the actual speed of the vehicle is equal to or lower than the predetermined value (vz1) and) when the steering angle is greater than a predetermined value, the turning center may be determined at a point positioned closer side to the vehicle with respect to a reference line which is in parallel to the front-rear direction of the vehicle and passes a point placed on the extension line of the rear wheel axle of the vehicle and distant from the standard position of the rear wheel axle inwardly in the turning direction by a turning radius obtained by dividing the wheel base of the vehicle by the tangent of the steering angle. According to this configuration, in particular, in the very low-speed zone where centrifugal force is negligible, when the steering angle is greater, the turning center comes closer to the vehicle, so that the turning radius is reduced. As a result, "small-radius turning ability" is improved. The small-radius turning ability refers to ease of reducing the turning radius.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
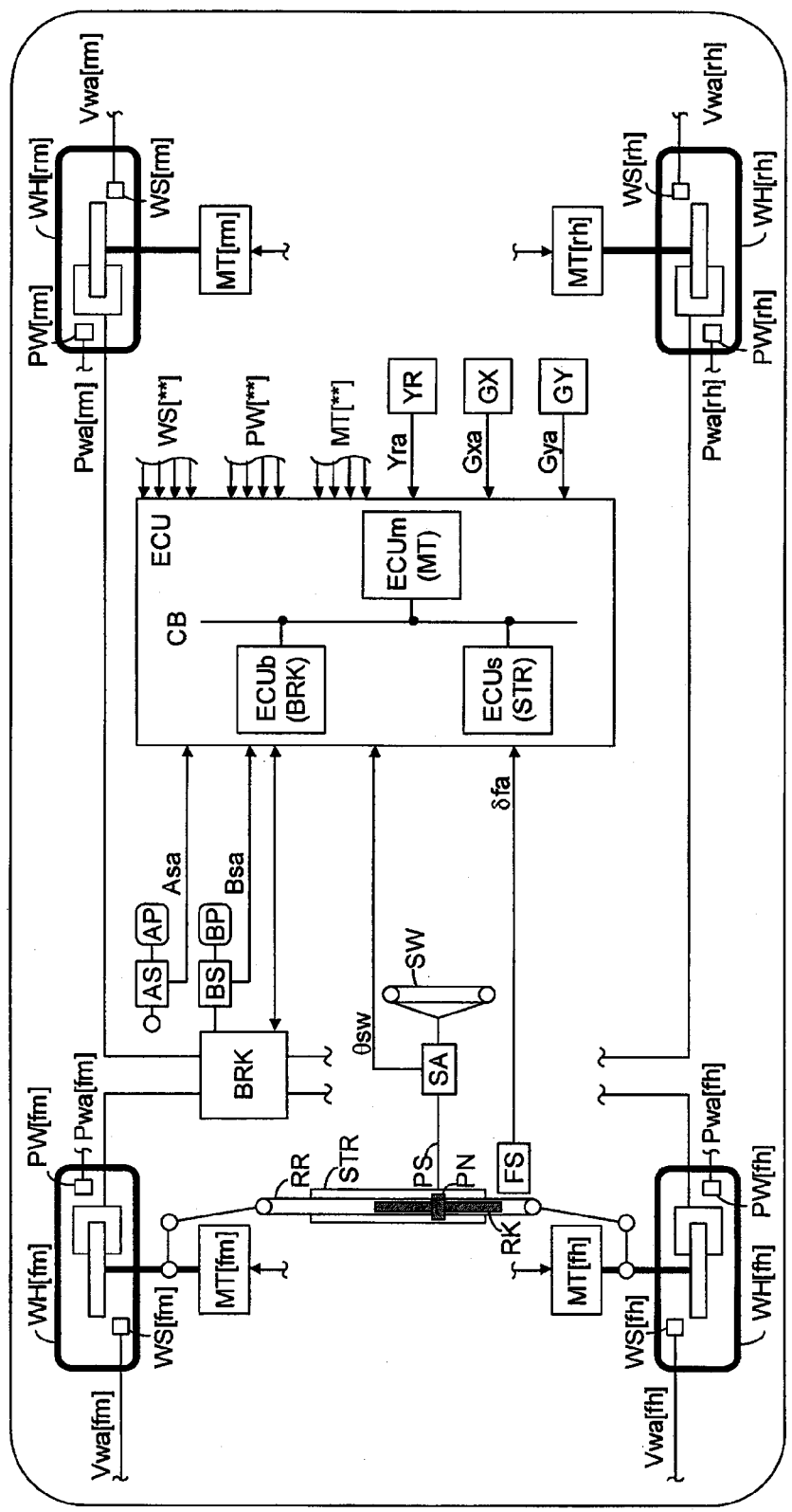
FIG. 1 is a schematic configuration diagram of a vehicle in which a speed control device of a vehicle according to an illustrative embodiment of the present invention is mounted.

Hereinafter, a speed control device of a vehicle according to an illustrative embodiment of the present invention will be described with reference to the drawings. FIG. 1 is a diagram showing the overall configuration of a vehicle in which a speed control device of a vehicle according to the illustrative embodiment (hereinafter, also referred to as "a device") is mounted. This vehicle is a four-wheel-drive vehicle including an electric motor (in-wheel motor) MT[] serving as a driving source is incorporated in the tire wheel of each wheel WH[]. That is, this vehicle is an in-wheel motor vehicle, and no differential is provided between the left and right front wheels, between the left and right rear wheels, and between the front wheels and the rear wheels.

The inventive concept of the present invention may be applied to a front-wheel-drive vehicle or a rear-wheel-drive vehicle. In the case of a front-wheel-drive vehicle, the electric motors MT[rm] and MT[rh] for the left and right rear wheels are omitted. In the case of a rear-wheel-drive vehicle, the electric motors MT[fm] and MT[fh] for the left and right front wheels are omitted. In the device, as speed control, control is performed in which the vehicle speed is adjusted in accordance with the acceleration operation amount of an acceleration operation member by the driver of the vehicle.

The suffix [**] attached to the end of various symbols denotes which of the four wheels the various symbols relate to. "f" denotes front wheels, "r" denotes rear wheels, "m" denotes right wheels in the vehicle traveling direction, "h" denotes left wheels in the vehicle traveling direction, "o" denotes outer wheels in the turning direction, and "i" denotes inner wheels in the turning direction. Thus, "fh" denotes the left front wheel, "fm" denotes the right front wheel, "rh" denotes the left rear wheel, and "rm" denotes the right rear wheel. Additionally, "fo" denotes the turning outside front wheel, "fi" denotes the turning inside front wheel, "ro" denotes the turning outside rear wheel, and "ri" denotes the turning inside rear wheel.

The turning direction of the vehicle includes a right direction and a left direction. In general, the right and left direction are marked with positive and negative signs. For example, the left direction is represented by the positive sign and the right direction is represented by the negative sign. However, in describing the magnitude relationship of the values or the increase/decrease of the values, the description is very complicated taking the sign into consideration. For this reason, in the following description, it is assumed that, unless particularly described, the magnitude relationship of the values and the increase/decrease of the values mean the magnitude relationship of the absolute values and the increase/decrease of the absolute values. It is also assumed that a predetermined value is a positive value.

(Configuration)

As shown in FIG. 1, the device includes a steering device STR. In the steering device STR, the rotational motion of a steering wheel SW is transmitted to a small gear (pinion) PN through a steering shaft (pinion shaft) PS. The rotational motion of the pinion PN is converted to a linear motion by a mechanism (rack and pinion mechanism) in which a flat plate gear (rack) RK and the pinion PN, such that the steered wheels (front wheels) are steered (controlled).

The device includes a steering wheel angle sensor SA and a front wheel steering angle sensor FS. The steering wheel angle sensor SA detects a rotation angle θsw from the neutral position (corresponding to a straight traveling of the vehicle) of the steering wheel SW.

The wheel steering angle δfa of the steered wheels (front wheels) is detected by the front wheel steering angle sensor FS. Specifically, as the front wheel steering angle δfa, a linear displacement δfa from the neutral position (corresponding to the straight traveling of the vehicle) of the rack RK or a rod (rack rod) RR in which the rack RK is provided is detected. Alternatively, as the front wheel steering angle δfa, a rotational displacement δfa from the neutral position (corresponding to the straight traveling of the vehicle) of the pinion PN or the shaft (pinion shaft) PS in which the pinion PN is provided may be detected.

The steering wheel angle sensor SA and the front wheel steering angle sensor FS are collectively called a steering angle acquisition unit (steering angle sensor) SAA, and the steering wheel rotation angle θsw and the front wheel steering angle δfa are collectively called the steering angle Saa. For example, the steering angle Saa is calculated by dividing the steering wheel rotation angle θsw detected by the steering wheel angle sensor SA by a steering gear ratio (also referred to as an overall steering gear ratio).

The device includes a wheel speed sensor WS[] which detects an actual wheel speed Vwa[], a yaw rate sensor YR which detects an actual yaw rate Yra applied to the vehicle, a front-rear acceleration sensor GX which detects a front-rear acceleration Gxa in the front-rear direction of the vehicle body, a lateral acceleration sensor GY which detects a lateral acceleration Gya in the lateral direction of the vehicle body, an inclination angle sensor KS which detects an inclination angle Ksa of the vehicle body, and an actual braking torque sensor (for example, wheel cylinder pressure sensor) PW[] which detects actual braking torque (for example, the braking liquid pressure of the wheel cylinder WC[]) Pwa[**].

The device includes an acceleration operation amount sensor AS which detects the operation amount Asa of the acceleration operation member (for example, an accelerator pedal) AP by the driver, and a braking operation amount sensor BS which detects the operation amount Bsa of a braking operation member (for example, a brake pedal) BP by the driver.

The device includes an electric motor MT[] which applies power to a wheel, a brake actuator BRK which controls braking liquid pressure, and an electronic control unit ECU. The electronic control unit ECU is a microcomputer which has a plurality of separate electronic control units ECUs (ECUb, ECUm, and ECUs) connected to each other through a communication bus CB. The electronic control unit ECU is electrically connected to various actuators (MT[] and the like) described above and various sensors (WS[**] and the like) described above. The electronic control unit (ECUb and the like) of each system in the electronic control unit ECU executes an exclusive-use control program. The signals (sensor values) of various sensors and the signals (internal calculation values) which are calculated in the respective electronic control units (ECUb and the like) are shared through the communication bus CB.

Specifically, the electronic control unit ECUm of the driving system controls the energizing state of the electric motor MT[] provided in each of the left and right wheels on the basis of the operation amount Asa of the acceleration operation member AP by the driver which is detected by the acceleration operation amount sensor AS, and adjusts the wheel speed and the driving torque of each wheel. The electronic control unit ECUm also controls the energizing state (regeneration brake state) of the electric motor MT[] provided in each of the left and right wheels on the basis of the operation amount Bsa of the braking operation member BP by the driver which is detected by the braking operation amount sensor BS, and adjusts the wheel speed and the braking torque of each wheel.

The electronic control unit ECUb of the braking system performs skid suppression control (braking/driving force control), such as anti-skid control (ABS control) or traction control (TCS control), on the basis of the signals from the wheel speed sensor WS[], the yaw rate sensor YR, the lateral acceleration sensor GY, and the like. The electronic control unit ECUb also calculates the speed Vxa of the vehicle on the basis of the wheel speed Vwa[] of each wheel detected by the wheel speed sensor WS[**] by a known method.

The brake actuator BRK has a known configuration in which a plurality of electromagnetic valves (liquid pressure adjustment valves), a liquid pressure pump, an electric motor, and the like. When brake control is not performed, the brake actuator BRK supplies braking liquid pressure based on operation of the braking operation member BP by the driver to the wheel cylinder WC[**] of each wheel, and applies braking torque based on operation of the braking operation member (brake pedal) to each wheel.

When brake control, such as anti-skid control (ABS control), traction control (TCS control), or vehicle stability control (ESC control) for controlling under-steering or over-steering, is performed, the brake actuator BRK can control braking liquid pressure in the wheel cylinder WC[] for each wheel WH[] separately from operation of the brake pedal BP and can adjust braking torque for each wheel.

In each wheel are provided the known wheel cylinder WC[], a brake caliper BC[], a brake pad PD[], and a brake rotor RT[]. Braking liquid pressure is applied to the wheel cylinder WC[] provided in the brake caliper BC[], such that the brake pad PD[] is pressed against the brake rotor RT[] and braking torque is applied on the basis of frictional force. Control of braking torque is not limited to control on the basis of braking liquid pressure, and control may be performed using an electric brake device.

The electronic control unit ECUs of the steering system performs power steering control (EPS control) to assist steering operation of the driver by a known method.

(Overview of Speed Control)

Figure 2:
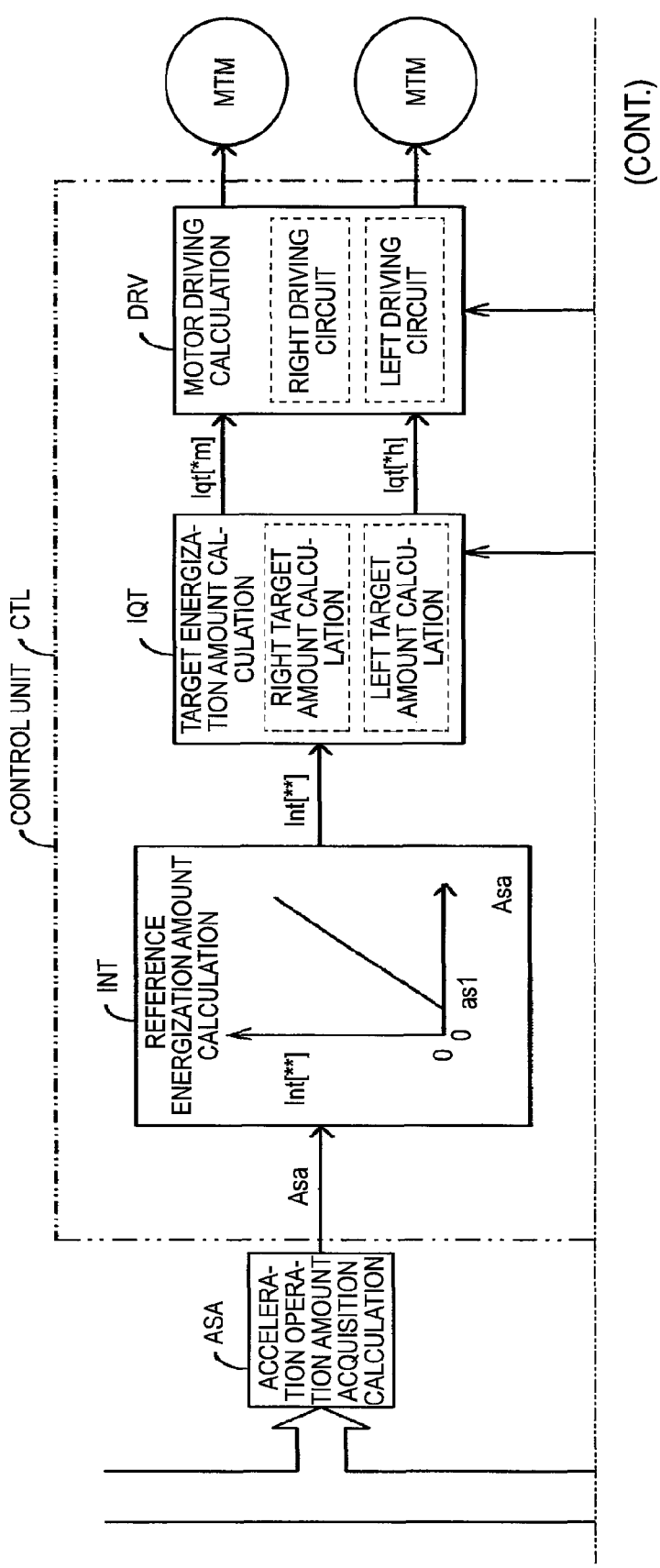
FIG. 2 is a functional block diagram when speed control is performed in the illustrative embodiment of FIG. 1.

Hereinafter, speed control which is performed by the device will be described with reference to FIG. 2. First, an acceleration operation amount acquisition calculation block ASA calculates the operation amount (acceleration operation amount) Asa of the acceleration operation member (for example, an accelerator pedal) AP detected by the acceleration operation amount sensor AS.

A reference energization amount calculation block INT calculates a reference energization amount Int[] on the basis of the acceleration operation amount Asa. The reference energization amount Int[] is a value corresponding to force (torque) which has to be generated by each electric motor MT[] when the vehicle is traveling straight. The reference energization amount Int[] is the amount corresponding to the energizing state of the electric motor and is calculated, for example, as the amount of current. The reference energization amount Int[**] may be calculated as the duty ratio of PWM (Pulse Width Modulation) for controlling the electric motor.

A steering angle acquisition calculation block SAA acquires the steering angle Saa (at least one of the steering wheel angle θsw and the front wheel steering angle δfa). For example, the steering angle Saa may be calculated on the basis of the detection signal of the front wheel steering angle sensor FS. The steering angle Saa may be calculated on the basis of the detection signal of the steering wheel angle sensor SA.

A turning direction determination calculation block TRN calculates the turning direction Trn of the vehicle on the basis of the steering angle Saa. Specifically, the turning direction Trn is calculated on the basis of the sign of the steering angle Saa.

An actual wheel speed acquisition calculation block VWA acquires the actual wheel speed Vwa[] of each wheel. For example, the actual wheel speed Vwa[] is calculated on the basis of the detection signal of the wheel speed sensor WS[]. A vehicle speed acquisition calculation block VXA calculates the actual speed (vehicle speed) Vxa of the vehicle. For example, the vehicle speed Vxa is calculated on the basis of the actual wheel speed Vwa[].

An in-turning adjustment coefficient calculation block GVW calculates an adjustment coefficient Gvw[] in turning for each wheel on the basis of the steering angle Saa, a steering geometry (the geometric relationship between the steering angle and the turning center of the vehicle) of the vehicle, and the vehicle speed Vxa. The steering geometry of the vehicle will be described below in detail. The adjustment coefficient Gvw[] is the coefficient for adjusting the target wheel speed Vwt[] of each wheel. The adjustment coefficient Gvw[]=1 corresponds to the straight traveling of the vehicle. At this time, the target wheel speeds of the left and right wheels are identical.

For the turning outside wheels (outer wheels), when the steering angle Saa is smaller than sa1 (>0), the adjustment coefficient Gvw[*0] becomes "1" and, when the steering angle Saa is equal to or greater than sa1, the adjustment coefficient is calculated by using the characteristic (characteristic Chgo) that the adjustment coefficient increases from "1" in accordance with an increase in the steering angle Saa from sa1. For the turning inside wheels (inner wheels), when the steering angle Saa is smaller than sa1, the adjustment coefficient Gvw[*i] becomes "1" and, when the steering angle Saa is equal to or greater than sa1, the adjustment coefficient is calculated by using the characteristic (characteristic Chgi) that the adjustment coefficient decreases from "1" in accordance with an increase in the steering angle Saa from sa1.

As described below with reference to FIGS. 6 and 7, the turning center of the vehicle can be determined on the basis of the vehicle speed Vxa and the like, and then the adjustment coefficient Gvw[] can be calculated on the basis of the turning center. The characteristics (the characteristic Chgo and the like) shown in FIG. 2 are an example of the characteristics when the vehicle speed is Vxa≤vz1 (predetermined value) (that is, when it is determined that the turning center is at the point O shown in FIG. 7). The characteristic of Gvw[] with respect to the steering angle Saa differs depending on the vehicle speed Vxa. The operation characteristics (Chgo and the like) are set in advance for each of a plurality of representative vehicle speeds. The turning outside wheels (outer wheels) and the turning inside wheels (inner wheels) are determined on the basis of the turning direction Trn.

When the vehicle speed Vxa is low, the adjustment coefficient Gvw[*o] of the outer wheels is calculated on the basis of the characteristic that the amount of an increase from "1" (an increase gradient with respect to the steering angle Saa) is great. When the vehicle speed Vxa is high, the adjustment coefficient Gvw[*o] is calculated on the basis of the characteristic that the amount of an increase from "1" (an increase gradient with respect to the steering angle Saa) is small. Meanwhile, when the vehicle speed Vxa is low, the adjustment coefficient Gvw[*i] of the inner wheels is calculated on the basis of the characteristic that the amount of a decrease from "1" (a decrease gradient with respect to the steering angle Saa) is great. When the vehicle speed Vxa is high, the adjustment coefficient Gvw[*i] is calculated on the basis of the characteristic that the amount of a decrease from "1" (a decrease gradient with respect to the steering angle Saa) is small.

An adjustment unit CSX calculates the target wheel speed Vwt[] of each wheel on the basis of the vehicle speed Vxa and the adjustment coefficient Gvw[]. Specifically, the target wheel speed Vwt[] is calculated by multiplying the vehicle speed Vxa by the adjustment coefficient Gvw[]. Thus, with an increase in the steering angle Saa, the target wheel speed Vwt[*0] of the outer wheels is calculated to be a value relatively greater than Vxa and the target wheel speed Vwt[*i] of the inner wheels is calculated to be a value relatively smaller than Vxa. That is, the target wheel speed Vwt[**] is calculated in accordance with the steering angle Saa.

A target energization amount calculation block IQT calculates a target energization amount Iqt[], which is the target amount of the energizing state of the electric motor MT[], on the basis of the reference energization amount Int[] and the target wheel speed Vwt[]. Similarly to the reference energization amount Int[], the target energization amount Iqt[] is the amount corresponding to the energizing state of the electric motor MT[] and is calculated, for example, as the amount of current. The target energization amount Iqt[] may be calculated as the duty ratio of PWM control for controlling the electric motor MT[**].

The target energization amount calculation block IQT includes a right target amount calculation block which calculates the target energization amount Iqt[*m] of the electric motor provided in each of the right wheels, and a left target amount calculation block which calculates the target energization amount Iqt[*h] of the electric motor provided in each of the left wheels.

In the right target amount calculation block, the reference energization amount Int[*m] is adjusted on the basis of the target wheel speed Vwt[*m] of the right wheels, and the target energization amount Iqt[*m] is calculated. When the vehicle turns left, the right wheels become the turning outside wheels. Thus, the target energization amount Iqt[*m] is calculated with an increase in the reference energization amount Int[*m]. When the vehicle turns right, the right wheels become the turning inside wheels. Thus, the target energization amount Iqt[*m] is calculated with a decrease in the reference energization amount Int[*m].

In the left target amount calculation block, the reference energization amount Int[*h] is adjusted on the basis of the target wheel speed Vwt[*h] of the left wheels, and the target energization amount Iqt[*h*] is calculated. When the vehicle turns left, the left wheels becomes the turning inside wheels. Thus, the target energization amount Iqt[*h] is calculated with a decrease in the reference energization amount Int[*h]. When the vehicle turns right, the left wheels become the turning outside wheels. Thus, the target energization amount Iqt[*h] is calculated with an increase in the reference energization amount Int[*h].

The target energization amount Iqt[] of each of the left and right wheels is input to a motor driving calculation block DRV which drives and controls the electric motors MT[], such that the right electric motor MTM and the left electric motor MTH are controlled. The motor driving calculation block DRV includes right and left driving circuits (driving circuits of the right and left electric motors) which supply power to the electric motors MTM and MTH.

In the motor driving calculation block DRV, feedback control is performed by using the actual wheel speed Vwa[] acquired by the actual wheel speed acquisition calculation block VWA such that the actual wheel speed Vwa[] coincides with (comes close to) the target wheel speed Vwt[]. That is, the actual wheel speed Vwa[] is compared with the target wheel speed Vwt[], and the comparison result (wheel speed deviation) ΔVw[](=Vwt[]–Vwa[]) is calculated. The energizing states of the electric motors are controlled on the basis of the wheel speed deviation ΔVw[**].

Figure 3:
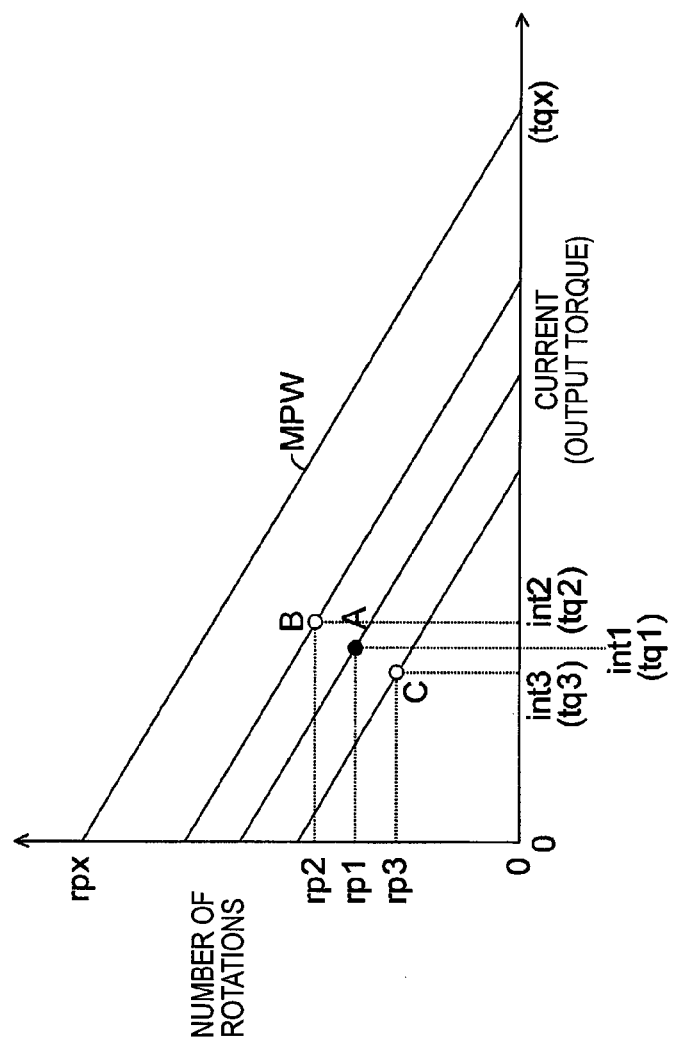
FIG. 3 is a diagram illustrating the details of a method of setting a target energization amount of an electric motor.

A method which sets the target energization amount Int[] of the electric motor will be described in detail with reference to FIG. 3. First, the reference energization amount Int[] is calculated in accordance with the acceleration operation amount Asa by the driver. The reference energization amount Int[**] is the amount corresponding to driving force for accelerating the vehicle as the driver demands.

The output characteristics of the electric motor can be represented by using a supply current and the number of rotations of the electric motor. The maximum output is determined on the basis of the characteristic MPW. The output torque of the electric motor and the amount of current are in proportion to each other. It is assumed that, when the vehicle is traveling straight and the reference energization amount Int[**] (the amount of current as a reference or the duty ratio as a reference for PWM control) is determined to be a value int1, driving torque having a value of tq1 is output, and the number of rotations of the electric motor has a value rp1. In this case, the operation point of the electric motor is a point A.

In this state, if the driver performs steering operation, the target wheel speed Vwt[] is calculated in accordance with the steering angle Saa and the steering geometry (which will be described below and, for example, a value obtained by dividing the wheel base L of the vehicle by the tangent of the steering angle Saa). The reference energization amount Int[] is adjusted in a feedforward manner on the basis of the target wheel speed Vwt[], such that the target energization amount Iqt[] is determined.

In the turning outside wheels, the target energization amount Iqt[*o] is adjusted to a value greater than the reference energization amount Int[*o] (the energizing state of the electric motor corresponding to straight traveling) in a feedforward manner. Thus, the output of the electric motor increases and the number of rotations of the electric motor increases. With the increase adjustment of the target energization amount Iqt[*o], the output torque of the electric motor increases, and the operation point of the electric motor is changed from the point A to a point B (output torque tq2 (>tq1) and the number of rotations rp2 (>rp1)).

In the turning inside wheels, the target energization amount Iqt[*i] is adjusted to a value smaller than the reference energization amount Int[*i] (the energizing state of the electric motor corresponding to straight traveling) in a feedforward manner. Thus, the output of the electric motor decreases and the number of rotations of the electric motor decreases. With the decrease adjustment of the target energization amount Iqt[*i], the output torque of the electric motor decreases, and the operation point of the electric motor is changed from the point A to a point C (output torque tq3 (<tq1) and the number of rotations rp3 (<rp1)).

As described above, the target energization amount Int[] of the electric motor is determined in a feedforward manner. The final adjustment of the energizing state of the electric motor is realized by feedback control based on the above-described wheel speed deviation $\Delta$Vw[]

With the final adjustment of the energizing state of the electric motor, it is possible to compensate the difference in the wheel speed between the left and right driving wheels due to the difference in the movement locus between the left and right wheels at the time of turning of the vehicle. As a result, it is possible to suppress an unnecessary front-rear skid in the left and right wheels.

(Ackermann Geometry and Steering Geometry)

Figure 4:
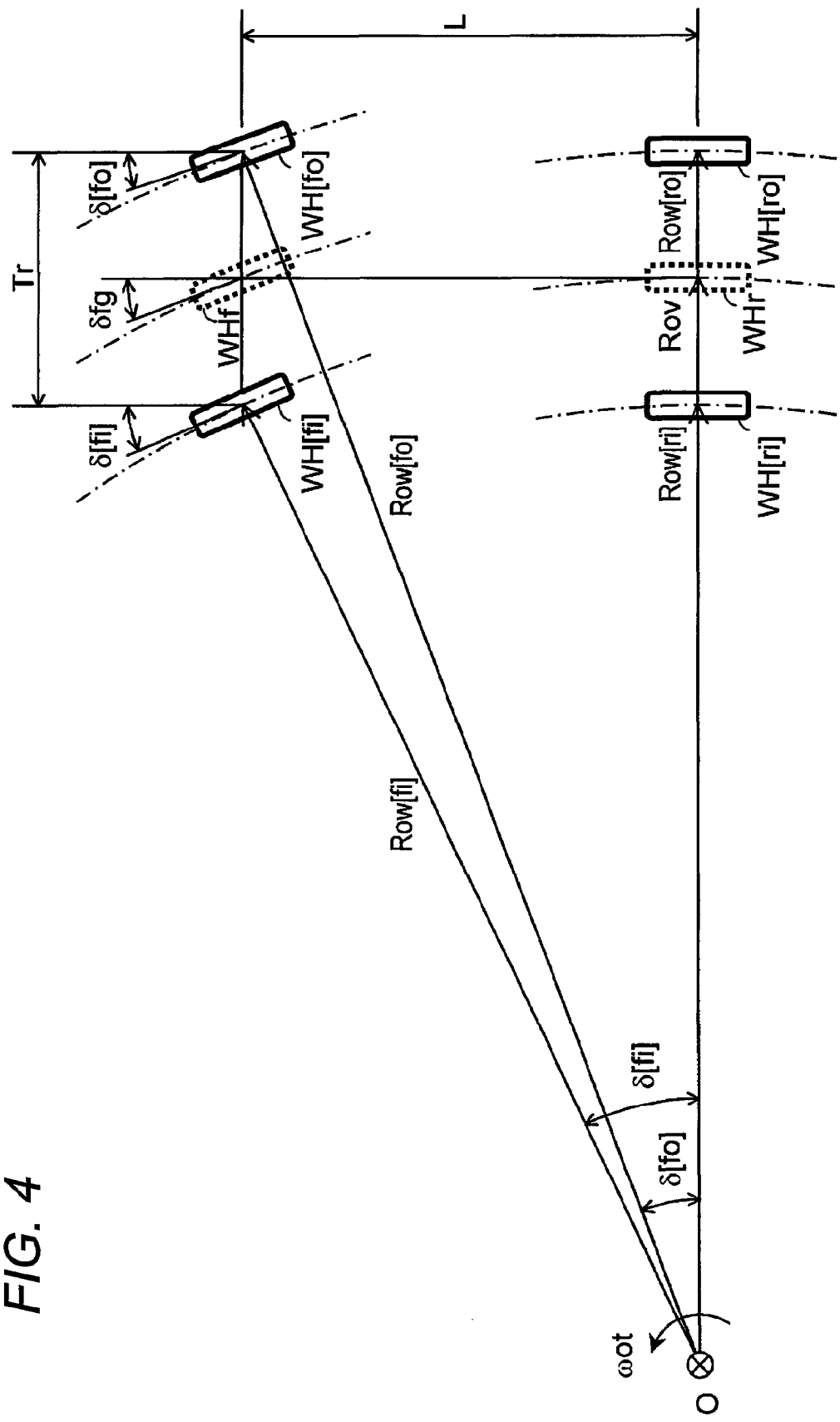
FIG. 4 is a diagram showing a movement locus of each wheel when the vehicle is at very low speed and turns such that no lateral skid occurs.

Hereinafter, prior to describing the steering geometry of the vehicle, the Ackermann geometry will be simply described. FIG. 4 shows the movement locus of each wheel when a vehicle with front wheels steered turns at very low speed such that centrifugal force is negligible, without causing a lateral skid in the front wheels (tire). When a vehicle is represented by a two-wheel model having two virtual wheels WHf and WHr indicated by a broken line in FIG. 4, the steering angle δfa of the front wheel WHf which is determined from the geometric relationship only is called an Ackermann actual steering angle. The following relationship is established.

$$\tan(\delta fg) = L/Rov$$

Here, L denotes a wheel base and Rov denotes a turning radius with respect to a turning center O.

The Ackermann actual steering angle δfg can be calculated on the basis of the steering angle Saa acquired by the steering angle acquisition unit SAA. Specifically, the Ackermann steering angle δfg is calculated on the basis of at least one of the front wheel steering angle δfa detected by the front wheel steering angle sensor FS and the steering wheel angle θsw detected by the steering wheel angle sensor SA.

In the case of a vehicle having four wheels in which front wheels are steered, in order to prevent a lateral skid in each wheel, it is necessary that each wheel turns around a single common point (point O). Thus, for preventing a lateral skid in each wheel, the condition is that the turning center (point O) exists on the extension line of the rear wheel axle and the inner front wheel steering angle δ[fi] is greater than the outer front wheel steering angle δ[fo]. The geometric relationship which satisfies this condition is called the Ackermann geometry.

In the theoretical characteristics of the Ackermann geometry in which a lateral skid is perfectly zero, the following relationship is established. Here, L denotes a wheel base, and Tr denotes a tread. The Ackermann actual steering angle δfg is the average value (δfg={δ[fo]+δ[fi]}/2) of the steering angles of the left and right front wheels (steering wheels).

$$\tan(\pi/2-\delta[fo])-\tan(\pi/2-\delta[fi])=Tr/L$$

Figure 5:
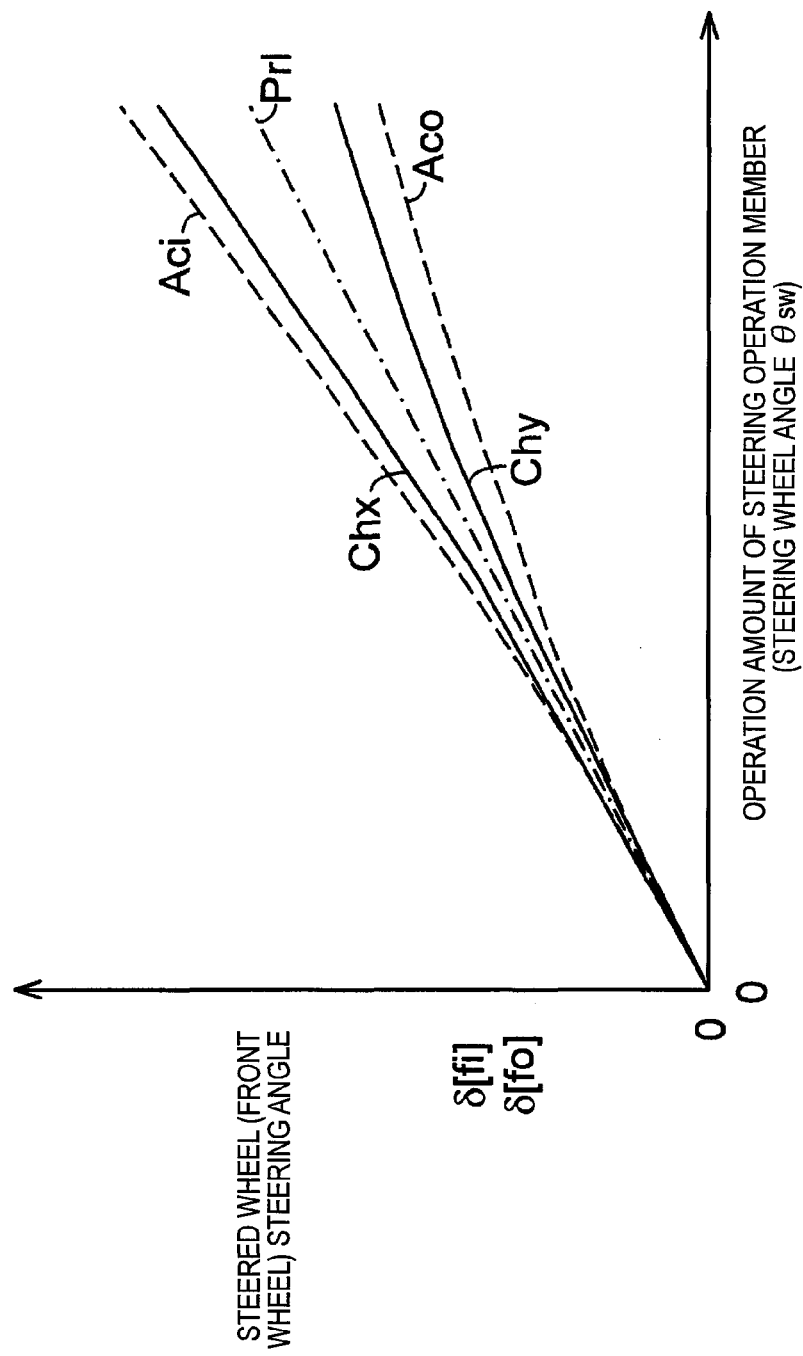
FIG. 5 is a graph showing a relationship between an operation amount of a steering operation member and a steering angle of each of left and right steering wheels.

Broken lines (curve) of FIG. 5 indicate the theoretical characteristics of the Ackermann geometry. A characteristic Aci is the theoretical characteristic of the inner wheel, and a characteristic Aco is the theoretical characteristic of the outer wheel. A one-dot-chain line (straight line) of FIG. 5 indicates a characteristic Pr1 of parallel geometry (the geometric relationship when the inner front wheel steering angle δ[fi] and the outer front wheel steering angle δ[fo] are identical).

Hereinafter, the geometric relationship between the geometric arrangement and the steering angles (the steering angles of the left and right steering wheels) of the wheels of the vehicle and the turning center of the vehicle is called "steering geometry". The actual steering geometry of the vehicle is determined under the geometric conditions (length, angle, and the like) of the linkage or joint of the steering device. As indicated by solid lines in FIG. 5, the characteristics of the actual steering geometry of the vehicle are set within the area which is sandwiched between the straight line (characteristic Pr1) corresponding to the parallel geometry and the theoretical curves (characteristics Aci and Aco) of the Ackermann geometry. Specifically, the characteristic of the steering geometry of the turning inside wheel of the steered wheels is set within the area which is surrounded by the theoretical characteristic Aci of the inner wheel of the Ackermann geometry and the characteristic Pr1 of the parallel geometry, for example, like a characteristic Chx. The characteristic of the steering geometry of the turning outside wheel of the steered wheels is set within the area which is surrounded by the theoretical characteristic Aco of the outer wheel of the Ackermann geometry and the characteristic Pr1 of the parallel geometry, for example, like a characteristic Chy. The characteristics Chx and Chy are set in advance.

With the steering geometry, as the operation amount of the steering operation member (for example, the rotation angle θsw of the steering wheel) increases, there occurs at least one of a gradient increase transition in which, the change amount of the steering angle (the change gradient of the steering angle) with respect to the operation amount in the turning inside wheel increases and transits and a gradient decrease transition in which the change amount of the steering angle (the change gradient of the steering angle) with respect to the operation amount in the turning outside wheel decreases and transits.

The steering angle acquisition calculation block SAA calculates the steering angle Saa which is the value (for example, the Ackermann actual steering angle δfg) between the steering angle δ[fi] of the turning inside wheel and the steering angle δ[fo] of the turning outside wheel. Here, the Ackermann actual steering angle δfg is the steering angle which is determined from the geometric relationship in which the wheel (tire) goes along the tangential direction of the movement locus thereof when the vehicle turns at very low speed. That is, the Ackermann actual steering angle δfg is "the angle having a tangent, a value of which is a ratio of the wheel base and the turning radius of the center of the rear wheel axle"

when the turning center is placed on the extension line of the rear wheel axle and is the average value of the steering angle δ[fi] of the steered wheel inside turning and the steering angle δ[fo] of the steered wheel outside turning.

(Details of Operation of Target Wheel Speed)

Next, the details of the operation of the target wheel speed shown in FIG. 2 will be described with reference to FIGS. 6 and 7. First, a reference turning center position determination calculation block OPE determines the position (reference position) (point O) of a reference turning center on the basis of the steering angle Saa and the steering geometry (the geometric relationship between the geometric arrangement and the steering angles of the wheels and the turning center of the vehicle) of the vehicle. The reference turning center refers to the point where the lateral skid of each wheel is minimized (about zero) at very low speed (≤vz1) such that centrifugal force applied to the vehicle being turning is negligible.

The reference position (point O) is determined on the extension line (referred to as rear wheel axle line) of the rear wheel axle of the vehicle. The steering geometry of the vehicle is set in advance (that is, known). Thus, the above-described Ackermann actual steering angle δfg is calculated on the basis of the steering angle Saa (for example, at least one of the steering wheel angle θsw and the actual steering angle δfa), and the position (the point O as the reference point) of the reference turning center with respect to the vehicle (for example, an intermediate point Cvh between the left and right wheels). Specifically, the distance (turning radius) Rov between the vehicle position (standard position) Cvh and the reference position (point O) is calculated in accordance with the following relationship, such that the reference position (point O) is determined.

$Rov = L/\tan(\delta fg)$ $\delta fg = (\delta[fi] + \delta[fo])/2$ or $\delta fg = \theta sw/N$ Here, N denotes a steering gear ratio.

That is, the reference position (point O) is determined on the basis of a value (=L/tan(Saa)) which is obtained by dividing the wheel base L of the vehicle by the tangent of the steering angle Saa. The vehicle position Cvh can be set at an arbitrary position in the vehicle.

A front-rear adjustment amount calculation block XCC calculates an adjustment amount (front-rear adjustment amount) Xc (see FIG. 7) in the front-rear direction for adjusting the position of the turning center with respect to the reference position (point O) on the basis of the vehicle speed Vxa. Here, the "front-rear direction" corresponds to the front-rear direction (traveling direction) of the vehicle. When the vehicle speed Vxa is lower than a predetermined value vz1, the front-rear adjustment amount Xc is "0" and, when the vehicle speed Vxa is equal to or higher than the predetermined value vz1, the front-rear adjustment amount Xc is calculated so as to increase from "0" in accordance with an increase in the vehicle speed Vxa. When the vehicle speed Vxa is equal to or higher than a predetermined value vz2 (>vz1), the front-rear adjustment amount Xc can be limited to an upper limit value Lr (the distance between the position of the center of gravity of the vehicle and the rear wheel axle).

Figure 7:
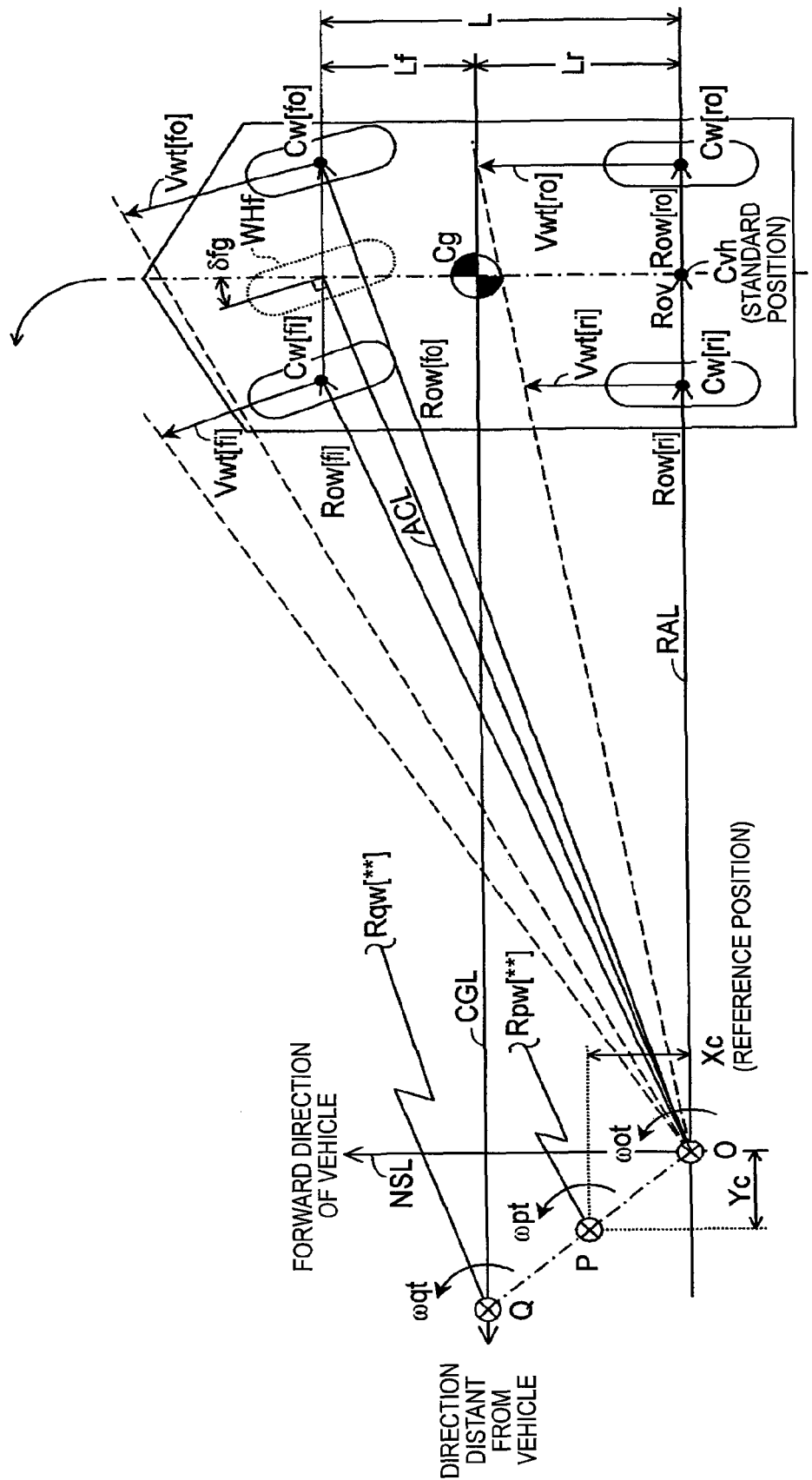
FIG. 7 is a diagram showing a geometric relationship between a turning center of a vehicle and a turning motion of a vehicle, which is used in explaining the target wheel speed operation block shown in FIG. 6.

A lateral adjustment amount calculation block YCC calculates an adjustment amount (lateral adjustment amount) Yc in the lateral direction for adjusting the position of the turning center with respect to the reference position (point O) on the basis of the vehicle speed Vxa (see FIG. 7). Here, the "lateral direction" corresponds to the lateral direction (the left-right direction with respect to the traveling direction) of the vehicle. When the vehicle speed Vxa is lower than a predetermined value vz1, the lateral adjustment amount Yc is "0" and, when the vehicle speed Vxa is equal to or higher than the predetermined value vz1, the lateral adjustment amount Yc is calculated so as to increase in accordance with an increase in the vehicle speed Vxa. When the vehicle speed Vxa is equal to or higher than a predetermined value vz3 (>vz1), the lateral adjustment amount Yc can be limited to an upper limit value y1 (a predetermined value which is calculated on the basis of the steering angle Saa).

A turning center position adjustment calculation block PPE calculates the position (point P) of the turning center after adjustment which is adjusted with respect to the point O (which exists on the extension line of the rear wheel axle) on the basis of the adjustment amounts Xc and Yc calculated by the front-rear adjustment amount calculation block XCC and the lateral adjustment amount calculation block YCC.

Thus, as the vehicle speed increases, the position (point P) of the turning center after adjustment which is adjusted with respect to the reference position (point O) on the basis of the front-rear adjustment amount Xc moves from the reference position (point O) toward the front of the vehicle. As a result, as the vehicle speed increases, a great lateral skid angle is applied to the front and rear wheels. Thus, lateral force which is balanced with centrifugal force is generated for each wheel. When the vehicle speed is equal to or higher than a predetermined value vz2 (for example, 60 km/h), the position (point P) of the turning center after adjustment is set (point Q) to be in parallel to the rear wheel axle and on the extension line (referred to as central axis) CGL of the center Cg of gravity of the vehicle.

As the vehicle speed increases, the position (point P) of the turning center after adjustment which is adjusted with respect to the reference position (point O) on the basis of the lateral adjustment amount Yc moves from the reference position (point O) in a direction distant from the vehicle. As a result, as the vehicle speed increase, the turning radius increases, the vehicle is adjusted to weaker under-steering tendency (slight under-steering tendency with respect to neutral steering).

A target angular speed calculation block OMG calculates the target angular speed ωpt of the vehicle in the turning direction with respect to the point P on the basis of the vehicle speed Vxa and the position (point P) of the turning center after adjustment. The target angular speed ωpt is calculated in accordance with the following relationship.

$\omega pt = Vxa/Rpv$

Here, Rpv denotes the distance (turning radius) between the vehicle (the point Cvh as the standard position) and the point P.

An individual wheel position turning radius calculation block RPW calculates the distance (turning radius) Rpw[] between the point P to each wheel position Cw[] on the basis of the position (point P) of the turning center after adjustment and the turning direction Trn. Specifically, the turning radius Rpw[] around the point P at each wheel position Cw[] is determined by a geometric processing using the wheel base L and the tread Tr which are known as the vehicle specification.

An individual target wheel speed calculation block VWS calculates the target wheel speed Vwt[] of each wheel on the basis of the target angular speed ωpt and the turning radius Rpw[]. Specifically, the target wheel speed Vwt[] is calculated in accordance with the following relationship. The above-described adjustment coefficient Gvw[] (see FIG. 2) corresponds to Rpw[**]/RPv.

$$Vwt[]=Rpw[]\cdot\omega pt(=Vxa\cdot Rpw[**]/Rpv)$$

According to the above-described device, when the vehicle is traveling at very low speed (for example, when Vxa≤vz1), the reference position (point O) is determined on the basis of the steering angle Saa (the intermediate value between the inner wheel steering angle and the outer wheel steering angle of the steering wheels) and the steering geometry (that is, the Ackermann actual steering angle δfg based on the steering angle Saa and the geometric relationship between Saa determined in accordance with the vehicle specification (wheel base) and the turning center of the vehicle). Specifically, the reference position (point O) is determined at a point which is placed on the rear wheel axle line RAL of the vehicle and distant from the reference position of the rear wheel axle (in particular, the center position in the axial direction of the rear wheel axle) in the vehicle inwardly in the turning direction by the "turning radius Roy obtained by dividing the wheel base L of the vehicle by the tangent of the steering angle Saa". In other words, the reference position (point O) is the intersection between a line ACL which passes through the position of the virtual wheel WHf at the center in the axial direction of the front wheel axle and extends in the vertical direction with respect to the direction of the Ackermann actual steering angle δfg calculated on the basis of the steering angle Saa and the rear wheel axle line RAL. That is, the reference position (point O) is determined on the rear wheel axle line RAL of the vehicle. The target angular speed ωot is calculated on the basis of the reference position (point O), and the target wheel speed Vwt[**] is calculated in accordance with the target angular speed ωot.

Thus, it is assumed that each wheel turns around the single common point which is the reference position (point O), and the target wheel speed Vwt[] is calculated such that the vehicle can smoothly turn at the target angular speed ωot around the reference position (point O). Thus, the target wheel speed Vwt[] can be separately determined such that the difference in the wheel speed between the wheels due to the difference in the movement locus between the wheels can be secured. In other words, the function of the differential can be realized. That is, it is possible to compensate an unnecessary front-rear skid due to the difference in the movement locus between the wheels and to suppress the occurrence of an unnecessary front-rear skid of each wheel in the vehicle turning state.

Here, the predetermined value vz1 will be further explained. The value vz1 can be the value corresponding to the creeping speed of the vehicle. In general, the term "creeping" refers to when the vehicle is traveling at very low speed in a state where the accelerator pedal AP is not operated (that is, the acceleration operation amount Asa=0) and the engine EG is in an idling state. The creeping is generated in a vehicle or the like in which an automatic transmission using a fluid joint or a torque converter in a clutch mechanism is mounted. In a vehicle in which a semiautomatic transmission having a mechanical clutch mechanism is mounted or an electric vehicle, such as an in-wheel motor vehicle, the creeping is not intrinsically generated, but the creeping may be generated in a pseudo manner so as to reduce a feeling of discomfort. Thus, the creeping speed is the vehicle speed when the driver does not operate the acceleration operation member and the vehicle is traveling by the creeping.

If the vehicle speed increases, it is necessary that lateral force which is balanced with centrifugal force due to turning of the vehicle is generated. If the vehicle speed becomes higher, in order to maintain safety of the vehicle, it is necessary that the steering characteristic of the vehicle is changed to under-steering tendency (finally, slight under-steering). In this case (Vxa>vz1), as the vehicle speed increases, the position (point P) of the turning center after adjustment is calculated by the adjustment amounts Xc and Yc calculated on the basis of the vehicle speed Vxa in the direction distant from the rear wheel axle line RAL toward the front of the vehicle and in the direction distant from the vehicle with respect to a vehicle parallel line (referred to as a neutral steering line) which passes through the reference center (point O). In the same manner as described above, the target angular speed ωpt is calculated on the basis of the point P, and the target wheel speed Vwt[**] is calculated in accordance with the target angular speed ωpt. Thus, a lateral skid angle (lateral skid) necessary for generating lateral force of the wheel can be generated, and the above-described under-steering tendency can be realized.

If the vehicle speed becomes a predetermined high speed (Vxa>vz2, for example, equal to or higher than 60 km/h), the position (point P) of the turning center after adjustment is calculated (point Q) to be on the central axis CGL and distant from the vehicle further than the neutral steering line NSL. The target wheel speed Vwt[**] is calculated on the basis of the point Q, such that the weaker under-steering characteristic of the vehicle is obtained.

Figure 6:
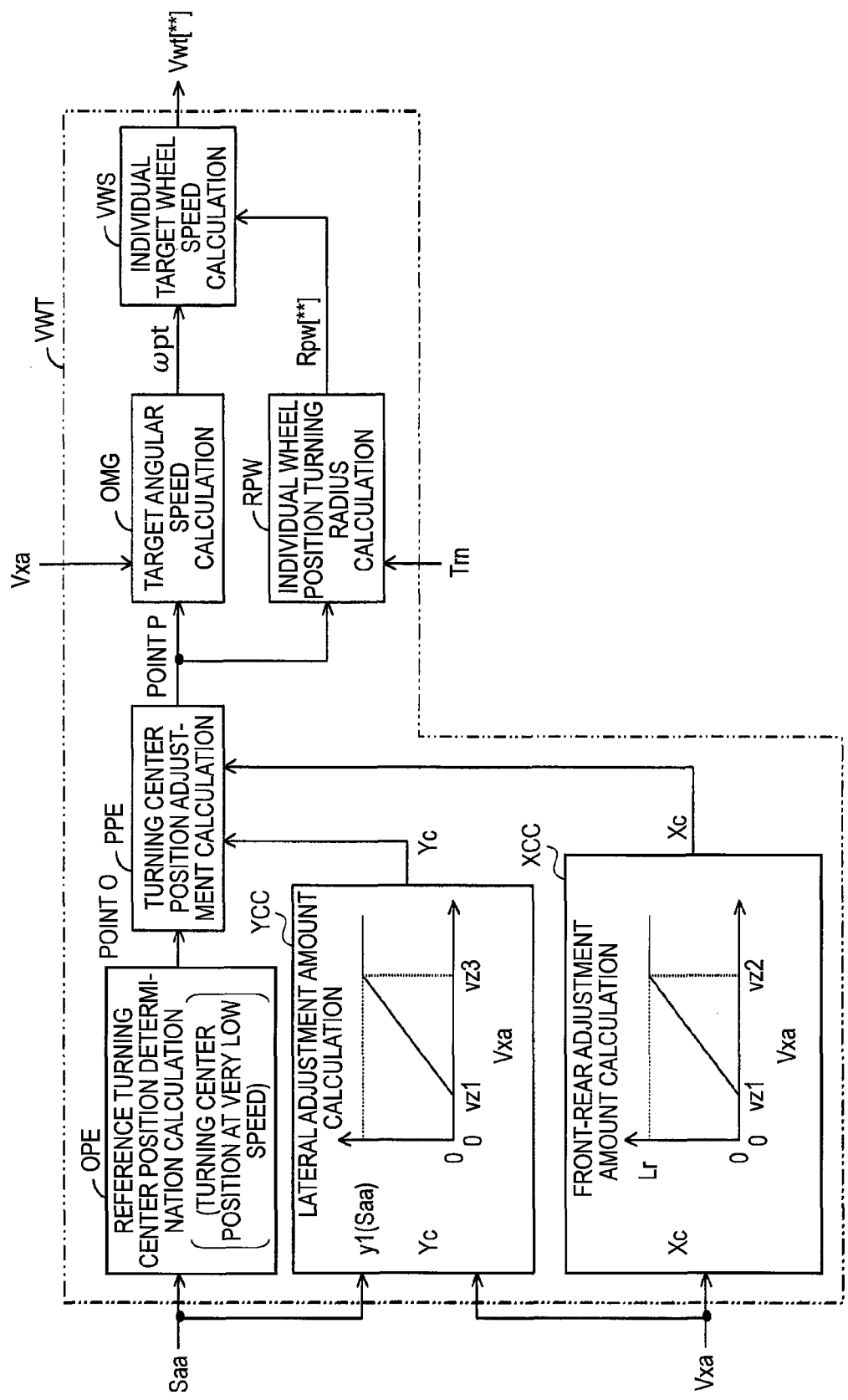
FIG. 6 is a functional block diagram of the details of a target wheel speed determination operation block shown in FIG. 2.

In the above-described illustrative embodiment, the position (point P) of the turning center is adjusted with respect to the reference position (point O) on the basis of the vehicle speed Vxa (see FIGS. 6 and 7). In addition, the position (point P) of the turning center can be adjusted with respect to the reference position (point O) on the basis of a steering characteristic value Sch (a value representing the degree of under-steering, neutral steering, or over-steering) of the vehicle.

Figure 9:
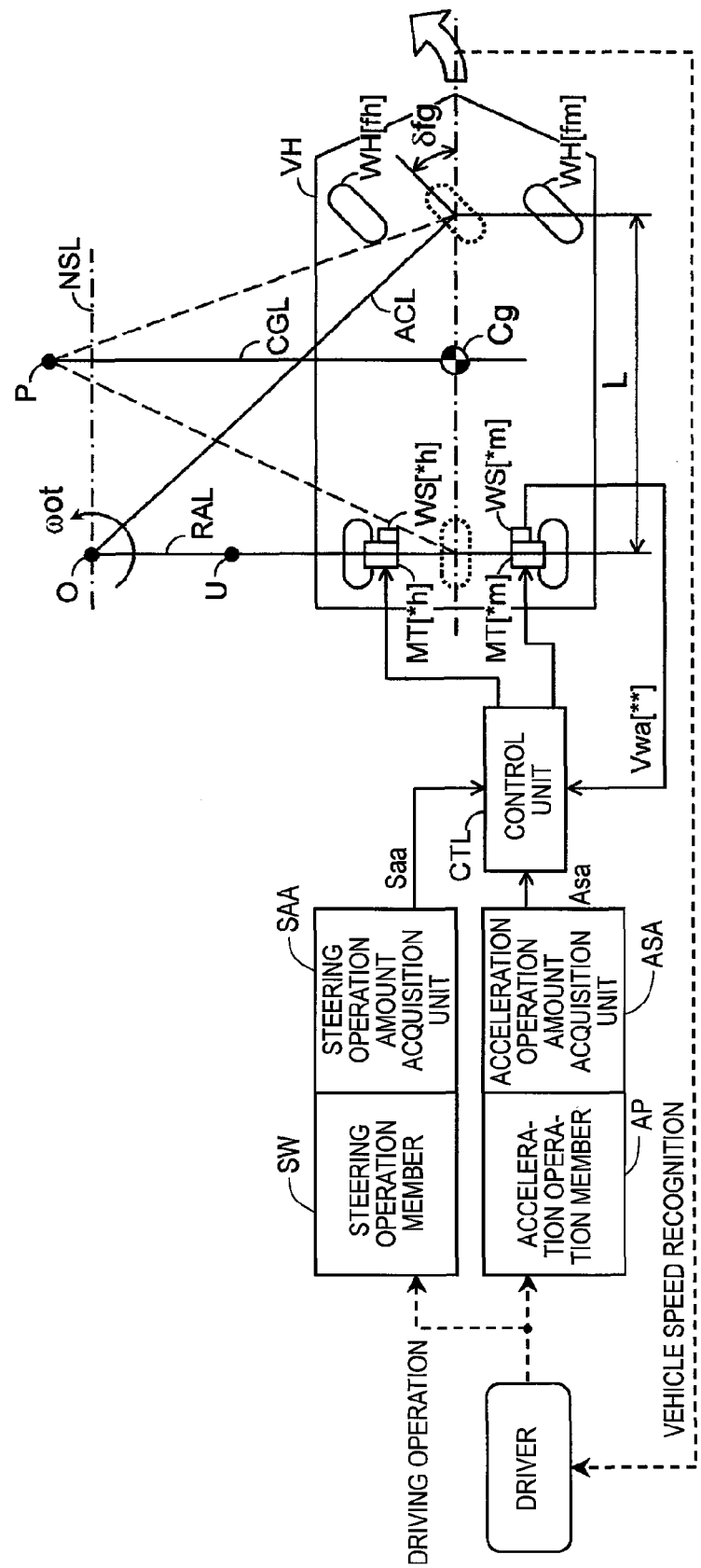
FIG. 9 is a diagram illustrating the advantages of the illustrative embodiment of the present invention.

In this case, as shown in FIG. 9, a steering characteristic value calculation block SCH calculates the steering characteristic value Sch on the basis of the steering angle Saa and an actual turning amount Tja (for example, an actual yaw rate Yra). The steering characteristic value Sch is the value representing the degree of under-steering, neutral steering, or over-steering of the vehicle, and the turning amount is the state amount representing the degree of turning of the vehicle. Specifically, the standard value (standard turning amount) Tjt (for example, a target yaw rate Yrt) of the turning amount is calculated on the basis of the steering angle Saa and compared with the actual value Tja of the turning amount. The comparison result (turning amount deviation (=Tja−Tjt)) becomes the steering characteristic value Sch. In this case, the steering characteristic value Sch is positive, this corresponds to over-steering. When the steering characteristic value Sch is "0", this corresponds to neutral steering. When the steering characteristic value Sch is negative, this corresponds to under-steering.

A correction amount calculation block YEC calculates a correction amount Ye. The correction amount Ye is the correction amount in the lateral direction for correcting the position (point P) of the turning center on the basis of the steering characteristic of the vehicle. When the steering characteristic value Sch is equal to or greater than "0" and smaller than a predetermined value sc1 (0≤Sch<sc1), Ye becomes "0". When the steering characteristic value Sch is equal to or greater than the predetermined value sc1 (Sch≥sc1), the correction amount Ye increases from "0" with an increase in the steering characteristic value Sch toward over-steering. Meanwhile, when the steering characteristic value Sch is greater than a predetermined value −sc2 and smaller than "0"

(−sc2<Sch<0), Ye becomes "0". When the steering characteristic value Sch is equal to or smaller than the predetermined value sc2 (Sch≤Sc2), the correction amount Ye decreases from "0" with an increase of the steering characteristic value Sch toward under-steering.

Thus, when the vehicle is in the over-steering state, the position (point P) of the turning center after adjustment is corrected to be distant (in the direction distant) from the vehicle by the correction amount Ye. As a result, the turning radius increases and the steering characteristic of the vehicle comes close to the neutral steering characteristic. Meanwhile, when the vehicle is in the under-steering state, the position (point P) of the turning center after adjustment is corrected to be close to (in the direction close to) the vehicle by the correction amount Ye. As a result, the turning radius decreases and the steering characteristic of the vehicle comes close to the neutral steering characteristic.

Hereinafter, the advantages of the device will be described with reference to FIG. 9. The driver of the vehicle operates the acceleration operation member (for example, an accelerator pedal) AP to control force (propulsive force) applied to the vehicle and recognizes the speed of the vehicle (for example, views the speedometer) to adjust the vehicle speed to an intended speed.

In a vehicle (in-wheel motor vehicle) having electric motors serving as a power source separately in the left and right wheels to which the inventive concept of the present invention is applied, the control unit CTL controls the energizing states of the electric motors MT[] on the basis of the acceleration operation amount Asa acquired by the acceleration operation amount acquisition unit ASA to adjust propulsive force (force generated by the electric motors) of the vehicle. For vehicle speed adjustment, the output of the electric motors MT[] is controlled by operation of the accelerator pedal by the driver.

A case will be considered where, when the vehicle is traveling straight at very low speed (a vehicle speed such that centrifugal force at the time of turning is negligible), the driver operates the steering operation member (for example, a steering wheel) SW and the vehicle is in the turning state. In this case, the energizing states of the electric motor MT[**] at the time of straight traveling are corrected on the basis of the steering angle Saa acquired by the steering angle acquisition unit SAA.

Specifically, the turning center (point O) on the extension line RAL of the rear wheel axle of the vehicle is determined on the basis of the steering geometry (that is, the Ackermann actual steering angle δfg based on the steering angle Saa and the geometric relationship between Saa determined by the vehicle specification (wheel base) and the turning center of the vehicle). The target wheel speed Vwt[] of each driving wheel is determined such that the turning angular speed is identical at the position of each driving wheel around the point O, and the energizing state of each electric motor MT[] is controlled such that the actual wheel speed Vwa [] reaches the target wheel speed Vwt[].

When the steering angle Saa is equal to or greater than the predetermined value sa2, the turning center can be determined at a point U which is on RAL and close to the vehicle further than a point (point O) determined on the basis of the steering geometry. The predetermined value sa2 corresponds to the maximum steering angle (the maximum steering angle of the steering device STR) or a value slightly smaller than the maximum steering angle. The target wheel speed Vwt[] of each driving wheel is determined such that the angular speed is identical at the position of each driving wheel around the point U, and the energizing state of each electric motor MT[] is controlled such that the actual wheel speed Vwa [] reaches the target wheel speed Vwt[]. Thus, the turning center is determined to be close to the vehicle. As a result, the turning radius of the vehicle decreases, thereby improving the small-radius turning ability.

Next, a case will be considered where the driver operates the steering wheel SW while the vehicle is traveling straight at high speed (a vehicle speed such that centrifugal force at the time of turning is applied to the vehicle) and the vehicle is in the turning state. In this case, similarly to the case where the vehicle is traveling at very low speed, the energizing state of each electric motor MT[**] at the time of straight traveling is corrected on the basis of the steering angle Saa acquired by the steering angle acquisition unit SAA.

Specifically, the turning center (point P) is determined in the forward direction with respect to the vehicle traveling direction further than RAL. The target wheel speed Vwt[] of each driving wheel is determined such that the angular speed is identical at the position of each driving wheel around the point P, and the energizing state of each electric motor MT[] is controlled such that the actual wheel speed Vwa [] reaches the target wheel speed Vwt[]. Thus, the turning center is determined at the front of RAL. As a result, a skid angle is generated in the front and rear wheels and lateral force occurs. The lateral force is balanced with centrifugal force applied to the vehicle, thereby maintaining the turning radius.

The point P can be determined to be distant from the vehicle further than the parallel line NSL with respect to the vehicle traveling direction which passes through the above-described point O. The target wheel speed Vwt[] of each driving wheel is determined such that the angular speed is identical at the position of each driving wheel around the point P, and the energizing state of each electric motor MT[] is controlled such that the actual wheel speed Vwa [] reaches the target wheel speed Vwt[]. When the turning center is placed to be distant from the vehicle further than NSL, this means that the vehicle is in the under-steering state. When the vehicle speed is high, the turning center is distant from the vehicle, such that the vehicle can have the weaker under-steering (slight under-steering) characteristic.

Figure 8:
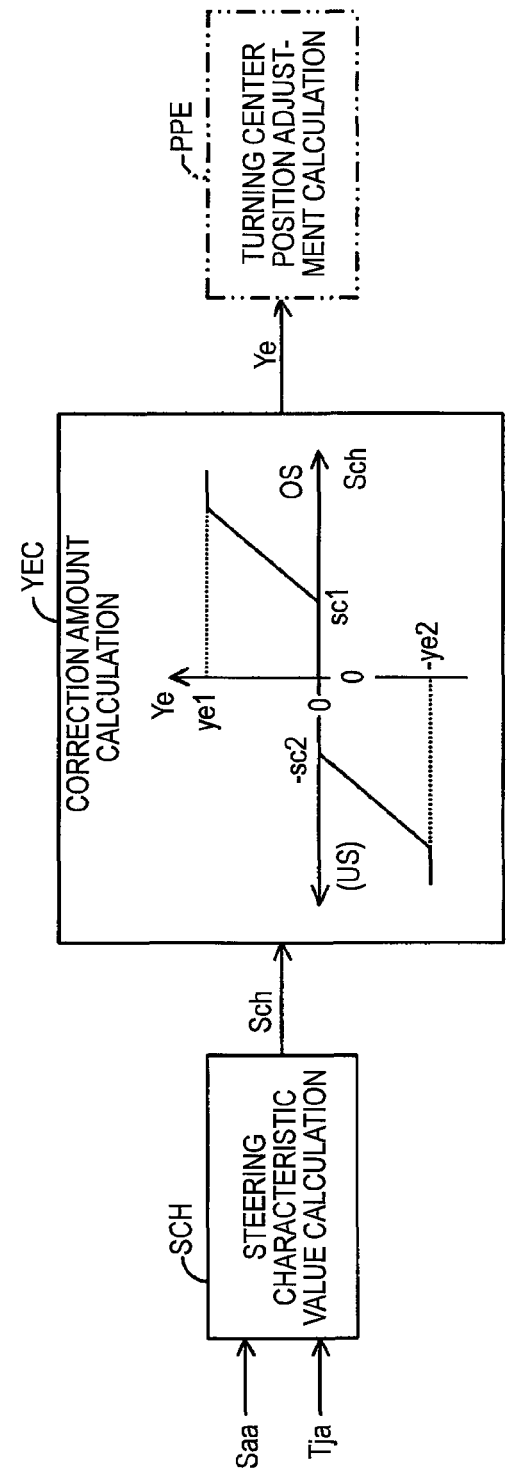
FIG. 8 is a functional block diagram when the position of a turning center is adjusted in a modified example of the illustrative embodiment shown in FIG. 1.

The steering characteristic value calculation block SCH can be provided which calculates the steering characteristic value Sch of the vehicle on the basis of Tja and Saa (see FIG. 8). When Sch represents excessive under-steering, the turning center is determined to be close to the vehicle. Meanwhile, when Sch represents excessive over-steering, the turning center is determined to be distant from the vehicle. Thus, the position of the turning center is determined on the basis of the steering characteristic value Sc, thereby appropriately maintaining the steering characteristic of the vehicle.

What is claimed is:

1. A vehicle speed control device comprising:
a steering device which is configured to steer left and right wheels in accordance with an operation of a steering operation member of a vehicle by a driver, and which is configured, when the steering operation member is operated from a neutral position corresponding to a straight traveling of the vehicle, adjust an inner wheel steering angle which is a steering angle of a turning inside wheel among the left and right steering wheels and an outer wheel steering angle which is a steering angle of a turning outside wheel such that the inner wheel steering angle becomes greater than the outer wheel steering angle;

a first electric motor configured to apply power to an axle of the right wheel among the left and right wheels of the vehicle to thereby adjust driving torque of the right wheel;

a second electric motor configured to apply power to an axle of the left wheel among the left and right wheels of the vehicle to thereby adjust driving torque of the left wheel, wherein an output shaft of the first electric motor and an output shaft of the second electric motor are not mechanically connected, and wherein the first electric motor and the second electric motor are configured to adjust propulsive force of the vehicle;

an operation amount acquisition unit configured to acquire an acceleration operation amount of an acceleration operation member by the driver of the vehicle;

a steering angle acquisition unit configured to acquire a steering angle which is a value between the inner wheel steering angle and the outer wheel steering angle;

a vehicle speed acquisition unit configured to acquire an actual speed of the vehicle; and a control unit configured to control the first electric motor and the second electric motor on the basis of the acceleration operation amount, the actual speed, the steering angle, and a steering geometry indicating a geometric relationship between the steering angle and a turning center of the vehicle.

2. The vehicle speed control device according to claim 1,
wherein the control unit includes a reference energization amount calculation unit configured to calculate a reference energization amount for each of the first electric motor and the second electric motor on the basis of the acceleration operation amount, and wherein the control unit is configured to adjust an energization amount of each of the first electric motor and the second electric motor such that the energization amount of an electric motor corresponding to the turning outside wheel among the first electric motor and the second electric motor becomes greater than the corresponding reference energization amount, and that the energization amount of an electric motor corresponding to the turning inside wheel among the first electric motor and the second electric motor becomes smaller than the corresponding reference energization amount.

3. The vehicle speed control device according to claim 1, further comprising:

an actual wheel speed acquisition unit configured to acquire an actual wheel speed of each of the left and right wheels, wherein the control unit includes a target wheel speed determination unit configured to determine a target wheel speed of each of the left and right wheels on the basis of the actual speed, the steering angle, and the steering geometry of the vehicle, and wherein the control unit is configured to control the first electric motor and the second electric motor such that the actual wheel speed of each of the left and right wheels reaches the target wheel speed of the corresponding wheel.

4. The vehicle speed control device according to claim 3,
wherein the target wheel speed determination unit is configured to determine the target wheel speed on the basis of a value which is obtained by dividing a wheel base of the vehicle by a tangent of the steering angle.

5. The vehicle speed control device according to claim 3,
wherein the target wheel speed determination unit configured to determine the turning center of the vehicle on the basis of the steering angle and the steering geometry of the vehicle, to calculate a target angular speed on the basis of the turning center and the actual speed of the vehicle, and to determine the target wheel speed on the basis of the target angular speed.

6. The vehicle speed control device according to claim 5,
wherein the target wheel speed determination unit is configured to determine the turning center as a point which is placed on an extension line of a rear wheel axle of the vehicle and is distant from a standard position on the rear wheel axle inwardly in a turning direction by a turning radius which is obtained by dividing the wheel base of the vehicle by a tangent of the steering angle when the actual speed of the vehicle is equal to or lower than a predetermined value.

7. The vehicle speed control device according to claim 5,
wherein the target wheel speed determination unit is configured to determine the turning center as a point which is further front of the vehicle with respect to an extension line of a rear wheel axle of the vehicle when the actual speed of the vehicle is higher than a predetermined value.

8. The vehicle speed control device according to claim 5,
wherein the target wheel speed determination unit is configured to determine the turning center at a point positioned further side from the vehicle with respect to a reference line which is in parallel to a front-rear direction of the vehicle and passes a point which is placed on an extension line of a rear wheel axle of the vehicle and is distant from a standard position on the rear wheel axle inwardly in a turning direction by a turning radius which is obtained by dividing the wheel base of the vehicle by a tangent of the steering angle, when the actual speed of the vehicle is higher than a predetermined value.

9. The vehicle speed control device according to claim 5,
wherein the target wheel speed determination unit is configured to determine the turning center at a point positioned closer side to the vehicle with respect to a reference line which is in parallel to a front-rear direction of the vehicle and passes a point which is placed on an extension line of a rear wheel axle of the vehicle and is distant from a standard position on the rear wheel axle inwardly in a turning direction by a turning radius which is obtained by dividing the wheel base of the vehicle by a tangent of the steering angle when the steering angle is greater than a predetermine value.

* * * * *